US009690703B1

(12) United States Patent
Jess et al.

(10) Patent No.: US 9,690,703 B1
(45) Date of Patent: Jun. 27, 2017

(54) SYSTEMS AND METHODS PROVIDING STORAGE SYSTEM WRITE ELASTICITY BUFFERS

(75) Inventors: Martin Jess, Erie, CO (US); Rod DeKoning, Wichita, KS (US); William P. Delaney, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 471 days.

(21) Appl. No.: 13/534,867

(22) Filed: Jun. 27, 2012

(51) Int. Cl.
*G06F 12/0815* (2016.01)
*G06F 12/0866* (2016.01)
*G06F 12/08* (2016.01)

(52) U.S. Cl.
CPC .................... *G06F 12/08* (2013.01)

(58) Field of Classification Search
CPC .... G06F 12/0866; G06F 1/1626; G06F 21/79; G06F 21/86; G06F 11/0724; G06F 11/0727; G06F 11/0757; G06F 11/0772; G06F 9/30109; G06F 9/30112; G06F 9/30145; G06F 9/3016
See application file for complete search history.

(56) References Cited

U.S. PATENT DOCUMENTS

| | | | | |
|---|---|---|---|---|
| 5,708,668 A * | 1/1998 | Styczinski | ............ | G06F 3/0611 711/114 |
| 6,578,108 B1 * | 6/2003 | Fujimoto | .............. | G06F 3/0607 711/114 |
| 7,020,758 B2 * | 3/2006 | Fisk | ......................... | H04L 41/08 711/114 |
| 7,231,409 B1 * | 6/2007 | Chen | .................... | G06F 11/1435 |
| 7,398,418 B2 * | 7/2008 | Soran | ..................... | G06F 3/0608 711/114 |
| 7,454,566 B1 * | 11/2008 | Overby | .................. | G06F 3/0607 711/100 |
| 7,464,199 B2 * | 12/2008 | Bissessur | ................ | G06F 13/28 710/22 |
| 7,610,445 B1 * | 10/2009 | Manus | ................ | G06F 12/0804 711/104 |
| 7,814,333 B2 * | 10/2010 | Choi | .................... | G06F 12/1441 713/187 |
| 7,882,307 B1 * | 2/2011 | Wentzlaff | ............ | G06F 12/0813 711/119 |
| 7,971,025 B2 * | 6/2011 | Murase | ................. | G06F 3/0607 711/161 |

(Continued)

*Primary Examiner* — Mark Giardino, Jr.
*Assistant Examiner* — Mohamed Gebril
(74) *Attorney, Agent, or Firm* — Haynes and Boone, LLP

(57) ABSTRACT

Systems and methods which implement a buffer for storing data to be written to a storage device when a data write operation of the storage device is determined to be outside of an acceptable parameter are disclosed. An elasticity buffer of embodiments may provide buffering on an as needed basis with respect to storage device cache flushing operations to thereby persistently store dirty write data from a storage device cache when a storage device data write is experiencing aberrant operation, such as when the data write is taking too long. The resources of the storage device cache may thus be cleaned and made available for subsequent data caching. The data may subsequently be written from the elasticity buffer to the storage device, such as after recovery action is taken with respect to the storage device, when the storage device starts completing data write operations in a timely fashion, etc.

21 Claims, 3 Drawing Sheets

(56) References Cited

U.S. PATENT DOCUMENTS

| | | | |
|---|---|---|---|
| 8,332,594 B2* | 12/2012 | Borntraeger | G06F 12/109 711/147 |
| 8,402,226 B1* | 3/2013 | Faibish | G06F 12/0804 710/52 |
| 8,499,114 B1* | 7/2013 | Vincent | G06F 9/5077 711/147 |
| 8,504,773 B1* | 8/2013 | Glasco et al. | 711/118 |
| 8,631,205 B1* | 1/2014 | Wentzlaff | G06F 12/0813 710/10 |
| 8,909,845 B1* | 12/2014 | Sobel | G06F 9/45558 711/154 |
| 8,996,837 B1* | 3/2015 | Bono | G06F 3/0614 711/114 |
| 9,280,469 B1* | 3/2016 | Kuang | G06F 12/0815 |
| 2005/0268067 A1* | 12/2005 | Lee | G06F 12/10 711/202 |
| 2006/0047908 A1* | 3/2006 | Chikusa | G06F 3/0613 711/114 |
| 2007/0156951 A1* | 7/2007 | Sultan | G06F 11/1044 711/103 |
| 2008/0010419 A1* | 1/2008 | Kao | G06F 13/1694 711/154 |
| 2008/0010420 A1* | 1/2008 | Kao | G06F 12/0223 711/154 |
| 2008/0010500 A1* | 1/2008 | Shimmitsu | G06F 11/1662 714/6.32 |
| 2008/0229045 A1* | 9/2008 | Qi | G06F 3/0605 711/170 |
| 2008/0263299 A1* | 10/2008 | Suzuki | G06F 11/1662 711/162 |
| 2009/0049264 A1* | 2/2009 | Resnick | G06F 12/0844 711/163 |
| 2009/0193189 A1* | 7/2009 | Carswell | G06F 11/1441 711/113 |
| 2009/0204872 A1* | 8/2009 | Yu | G06F 3/0613 714/773 |
| 2009/0240880 A1* | 9/2009 | Kawaguchi | G06F 3/0617 711/114 |
| 2010/0169401 A1* | 7/2010 | Gopal | G06F 7/02 708/316 |
| 2010/0281208 A1* | 11/2010 | Yang | G06F 3/0611 711/103 |
| 2010/0306174 A1* | 12/2010 | Otani | G06F 11/1464 707/640 |
| 2011/0185120 A1* | 7/2011 | Jess | G06F 3/061 711/114 |
| 2011/0252181 A1* | 10/2011 | Ouye | G06F 17/30519 711/101 |
| 2012/0023365 A1* | 1/2012 | Byom | G06F 11/073 714/6.13 |
| 2012/0110592 A1* | 5/2012 | Shah | G06F 9/5077 718/104 |
| 2013/0124807 A1* | 5/2013 | Nielsen | G06F 11/1438 711/162 |

* cited by examiner

SYSTEMS AND METHODS PROVIDING STORAGE SYSTEM WRITE ELASTICITY BUFFERS

TECHNICAL FIELD

The invention is directed generally to storage systems and, more particularly, to providing storage system write elasticity buffers.

BACKGROUND OF THE INVENTION

The creation and storage of digitized data has proliferated in recent years. Accordingly, various storage systems that facilitate efficient and cost effective storage of large amounts of digital data are common today. For example, a storage system may utilize one or more arrays of storage devices, such as in a redundant array of independent disks (RAID), to facilitate the creation, storage, retrieval, and/or processing of digital data. Such a storage system may be implemented using a variety of storage architectures, such as a network-attached storage (NAS) environment, a storage area network (SAN), a direct-attached storage environment, etc., and a variety of levels, such as RAID 0, RAID 1, RAID 2, RAID 3, RAID 4, RAID 5, etc, and combinations thereof. The storage devices utilized by the storage system may comprise various configurations of storage devices, such as hard disk drives, solid state drives, flash memory, etc.

The storage system may include interfaces for one or more application system (e.g., client system, server system, etc.) to interact with the storage system for storing and accessing digital data within storage devices of the storage system. A storage system controller may be provided as part of the storage system, disposed between the application system and the storage devices of the storage arrays, to facilitate communication of data therebetween. For example, a storage system controller may be implemented upon a host processor-based system of the storage system which is configured to include appropriate hardware (e.g., input/output, memory, processor, etc.) and logic (e.g., instruction sets, software, firmware, etc.) operable to facilitate data storage using one or more associated storage device arrays. A common architecture for a storage system storage device controller includes a controller cache, typically implemented using dynamic random access memory (DRAM), to hold data being read from and/or written to the storage devices of the storage system. Such a cache is typically organized into cache blocks which are used to hold the cached data.

For storage devices implementing small computer system interface (SCSI) logical units (LU) with a write through (WT) cache mode, the data for writing to the storage devices is inserted into the controller cache and then immediately written out from this cache to the appropriate storage devices. A "good" status indicator is not returned to the host until the data has been written successfully to the storage devices.

However, for storage devices implementing SCSI logical units (LU) with a write back (WB) cache mode, the data for writing to the storage devices is inserted into the controller cache, the status is returned to the host when the data is inserted into the cache, and at some later point in time the data is written from the cache to the appropriate storage devices. During the period of time between the insertion of the data into the cache and writing the data to the storage devices, the data in the cache is inconsistent with the corresponding data on the storage devices. The data in the cache is thus referred to as dirty data. Once the dirty cache blocks have been successfully written to the appropriate storage devices (referred to as flushing the dirty data), the cache blocks are marked as clean.

In both the WT and WB cache mode cases, write latency associated with writing data from the cache to the corresponding storage devices can increase significantly due to various phenomena. For example, one or more storage devices may misbehave (i.e., experience a period of aberrant operation, operate outside of performance specifications for a period of time, fail, etc.) resulting in delayed and/or failed data write operations. Such misbehavior may, for example, be associated with a storage device internal condition (e.g., an error recovery/retry algorithm), and is often not associated with a storage device malfunction per se. In particular, many storage devices (e.g., relatively inexpensive hard disk drives) provide a wide performance parameter range which is considered "normal" or "acceptable", and thus may present significant write latency variation in their normal operation. Excessive data write latency, whether remaining within the normal storage device operating parameters (e.g., published operating specifications), are nevertheless referred to herein as storage device misbehavior. Irrespective of the particular source of the storage device misbehavior, such storage device misbehavior may result in undesired storage system operation.

Some applications providing storage of digitized data, such as streaming media applications (e.g., high definition video surveillance), require that write latency associated with writing data to the underlying storage devices is maintained within specific, relatively narrow limits in order to avoid data loss and/or other undesirable results. In particular, if the write latency of one or more storage device increases significantly for some period of time, the delay in writing data and thus cleaning the storage system data cache can cause undesired results in other system components. For example, such increased write latency may result in an application system (e.g., media server) which is accessing the storage system to run out of buffer space and start dropping data (e.g., frames of the streaming video provided by the aforementioned high definition surveillance system may be dropped, thereby resulting in poor quality video images).

In the WT cache mode case, the foregoing data write latency increases will directly increase the latency of the actual host write since the host cannot complete until all the underlying data writes are complete. In the WB cache mode case, the foregoing data write latency increases will delay marking the dirty cache blocks clean so that these cache blocks can be used for other writes (or reads) by the storage device controller.

In a storage system having a correctly sized storage device cache, the storage device controller cache flush process will be able to keep up with the host write requests so there will always be clean or free cache blocks available for new host writes. However, if the flush process cannot keep up with the host write arrival rate, such as due to data write latency associated with a misbehaving storage device, the storage device controller cache will eventually become saturated and a host write request will have to wait until cache blocks become free/clean.

Potentially increasing the opportunity for a storage device cache, or some portion thereof, to become saturated, some storage arrays establish a specific limit on how many dirty cache blocks a particular drive group may have. This means that a host data write for a LU in a drive group may be required to wait for clean/free cache blocks when the dirty cache block limit for the drive group has been reached, even though the storage device cache may not have been fully saturated.

In operation, a storage device controller may write data to the storage devices in stripes (i.e., a stripe comprises a block of data written across a plurality of storage devices using chunks, wherein a chunk is the unit of data to be written to a single storage device). Accordingly, the storage device controller may not mark the storage device cache blocks of a stripe clean until all the cache blocks in the stripe have been written to the storage devices. This means that a single misbehaving storage device in a storage device group can delay cleaning not only the cache blocks corresponding to the misbehaving storage device but all cache blocks corresponding to the storage devices of the entire storage device group for the stripe being written.

From the foregoing, it can readily be appreciated that data write latency associated with writing data to one or more storage devices of a storage system can relatively quickly result in appreciable performance degradation and/or unsatisfactory operation of the storage system. Even where a caching mode, such as the aforementioned WB caching mode, is enabled, a misbehaving storage device or other system issue in the storage system can cause data writes to be delayed and/or data to be lost as the storage device cache limit is reached.

Although it may be possible to enlarge the storage device cache in an attempt to accommodate temporary storage device misbehavior, such a solution has been found to be unsatisfactory. In particular, such storage system host level storage device caches are comprised of DRAM, which is a relatively expensive resource. The amount of storage device cache memory may be on the order of a plurality of gigabytes for each volume or other container for which storage device caching is to be provided. The cost to implement such added memory to a large storage system configuration has typically proven undesirably high.

Another potential way to address the foregoing storage device misbehavior is to utilize higher quality storage devices. For example, rather than populating a storage device array with a plurality of relatively inexpensive hard disk drives, higher quality hard disk drives providing a more narrow range of normal or acceptable operating parameters may be used. Such a solution, however, can be relatively expensive due to the fact that not only are the individual hard disk drives more expensive, but due to the number of hard disk drives used. Moreover, such a solution is contrary to a fundamental tenet of RAID (i.e., inexpensive).

BRIEF SUMMARY OF THE INVENTION

The present invention is directed to systems and methods which implement a buffer for storing data to be written to a storage device of a storage system when a data write operation of the storage device is determined to be outside of an acceptable parameter. Such a buffer is referred to herein as an elasticity buffer due to its operation providing elasticity (i.e., facilitating returning to a normal state following aberrant operation) with respect to storage device write operations. An elasticity buffer of embodiments of the invention may, for example, provide buffering on an as needed basis with respect to storage device cache flushing operations to thereby persistently store dirty write data from a storage device cache when a storage device data write operation is taking too long. In operation according to embodiments, a timer may be started when the storage device controller issues a data write with respect to a storage device and, if the timer expires before the data write is completed on that storage device, the data is written to an elasticity buffer. The respective resources of the storage device cache (e.g., cache blocks) may thus be cleaned and made available for subsequent data caching despite the temporary aberrant operation of the storage device delaying completion of data write operations. The data may subsequently be written from the elasticity buffer to the storage device at some later point in time, such as after recovery action is taken with respect to the storage device, when the storage device starts completing data write operations in a timely fashion, etc.

Elasticity buffers are added to or in association with a storage device controller of a storage system according to embodiments of the invention. For example, the storage media used in providing elasticity buffers of embodiments is directly accessible to a storage device controller, such as by providing the storage media of the elasticity buffer on a peripheral component interconnect express (PCIe) card in the storage device controller. Thus, the storage device controller can use an elasticity buffer of embodiments herein to persistently store dirty write data of a storage device cache flushing operation when a storage device experiences a period of aberrant data write operation.

The elasticity buffers of embodiments herein may be implemented using various storage media, such as solid state memory, magnetic memory, etc. However, elasticity buffers of a preferred embodiment are implemented using flash storage media to provide relatively inexpensive and suitably large persistent storage. Although flash storage media is generally limited in the number of write cycles that are supported before failure of the memory cells, the service life of the elasticity buffers here is maximized due to the storage media of the elasticity buffers only being used when the corresponding storage device write operation experiences a period of aberrant operation (in contrast to a read/write flash cache configuration where all writes to the storage device controller pass through the flash cache, thereby exposing the flash storage media to considerably greater "wear").

Embodiments herein provide elasticity buffers for use on a per storage device basis. Although each storage device of a plurality of storage devices may be provided with a corresponding elasticity buffer, embodiments operate to utilize fewer elasticity buffers than storage devices for which buffering is provided by the elasticity buffers. For example, a relatively small number of elasticity buffers, perhaps even 1 elasticity buffer, may be utilized to buffer data in accordance with the concepts herein due only a small number of storage devices of a storage device array are likely to experience aberrant behavior at any particular point in time.

Since such elasticity buffers of embodiments are on the storage device-side of a storage device controller, the bandwidth requirements for those elasticity buffers are considerably lower than caches on the host side of the storage device controller. That is an elasticity buffer of configurations herein accommodates the data bandwidth or an associated storage device which is considerably less than the data bandwidth of a traditional cache which handles the full aggregate workload of the hosts using the storage system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
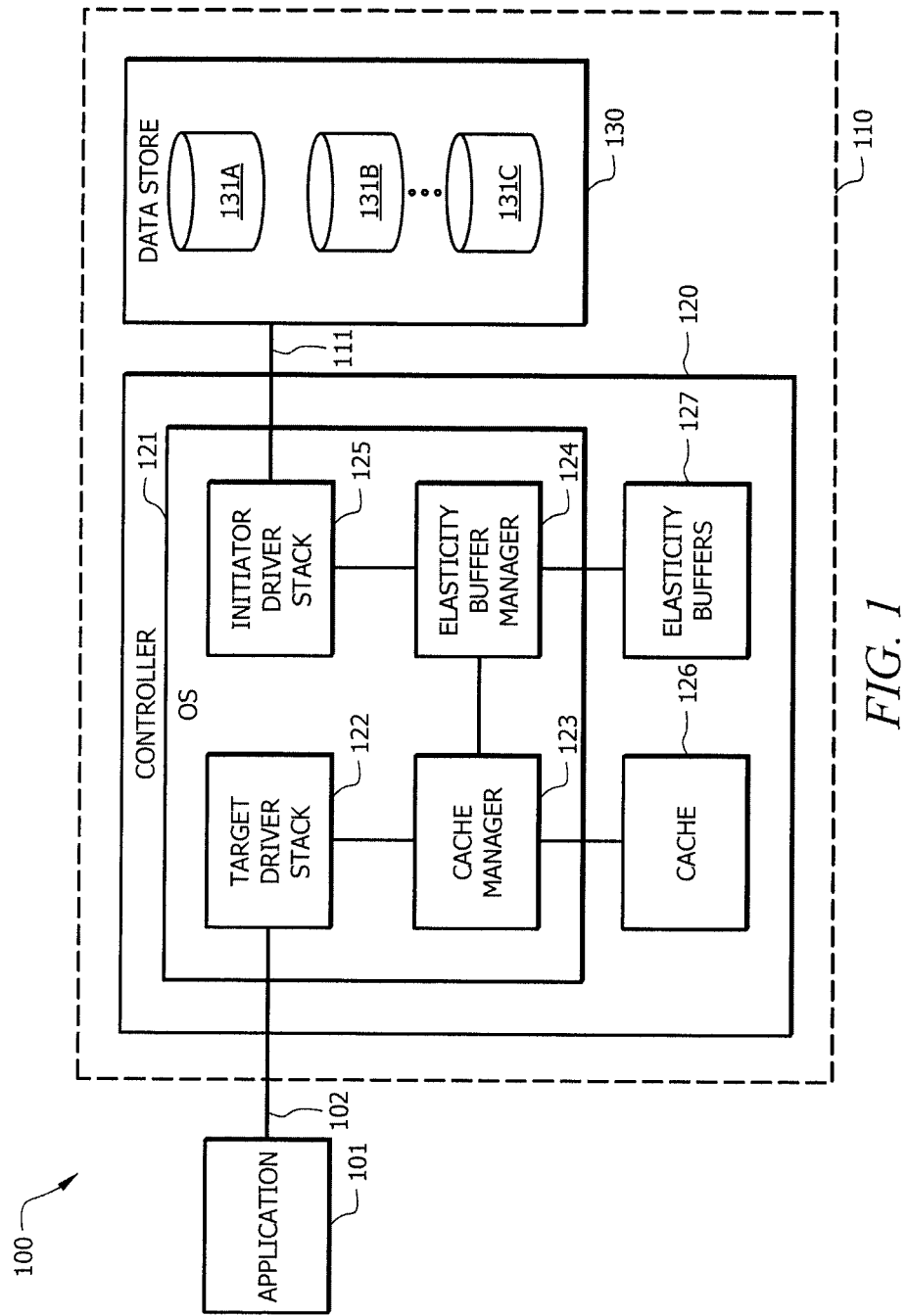
FIG. 1 shows a block diagram of a system adapted to utilize elasticity buffers according to embodiments of the invention.

FIG. 1 shows a block diagram of a system adapted according to embodiments of the invention to implement elasticity buffers operable for storing data to be written to a storage device when a data write operation of the storage device is determined to be outside of an acceptable parameter. System 100 of FIG. 1 comprises an exemplary storage array architecture in which storage system 110 includes data store sub-system 130 operable under control of storage device controller 120 to provide data storage services with respect to one or more applications, represented as application 101. It should be appreciated that a storage system adapted in accordance with the concepts of the present invention is not limited to the exemplary configuration shown in FIG. 1. For example, although one storage device controller and one data store sub-system are shown, embodiments may comprise a plurality of storage device controllers and/or a plurality of data store sub-systems, if desired.

Not only may storage system 110 of embodiments comprise one or more modules, components, etc., such as storage device controller 120 and data store 130 shown in FIG. 1, but the various modules, components, etc. of storage system 110 may themselves comprise one or more modules, components, etc. For example, storage device controller 120 of the illustrated embodiment comprises various functional blocks (shown as target driver stack 122, cache manager 123, elasticity buffer manager 124, and initiator driver stack 125) operable within operating system (OS) 121 to cooperate with various memory elements (shown as cache 126 and elasticity buffers 127) to provide operation according to embodiments herein. Data store 130 comprises a storage array having a plurality of storage devices (shown as storage devices 131a-131n), such as may comprise hard disk drives, solid state drives, optical disks, flash memory, etc., operable to store user and/or other data under control of storage device controller 120.

Storage device controller 120 may comprise one or more processor-based host systems, such as file server systems, computer appliances, computer workstations, etc. Accordingly, storage device controller 120 of embodiments comprises a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of one or more instruction sets (e.g., software, firmware, applet, code, etc.) providing operation as described herein. Accordingly, target driver stack 122, cache manager 123, elasticity buffer manager 124, and initiator driver stack 125 may comprise program logic (e.g., code) operable within OS 121 to provide operation as described herein.

Cache 126 and elasticity buffers 127 of embodiments may comprise various configurations of memory elements. For example, cache 126 of embodiments herein comprises a traditional controller cache configuration, implemented using dynamic random access memory (DRAM), to hold data being read from and/or written to the storage devices of data store sub-system 130. Elasticity buffers 127 of embodiments comprise nonvolatile memory, such as may be implemented using battery backed up RAM, flash memory, ferroelectric random access memory (F-RAM), magnetoresistive RAM (MRAM), magnetic memory, etc., to hold data being written to storage devices exhibiting a period of aberrant operation (referred to herein as misbehaving storage devices), such as storage devices taking an unacceptably long time to complete a data write operation. It should be appreciated that, although the illustrated embodiment shows elasticity buffers 127 disposed as part of storage device controller 120, elasticity buffers of embodiments may be provided in different configurations, such as provided in association with and coupled to a storage device controller.

Elasticity buffers 127 of embodiments herein may comprise a memory which is separate from that of cache 126 or may comprise a portion of the memory used in providing cache 126. Although, in most environments, it is advantageous to utilize nearly 100% of available non-volatile cache for typical cache operations (e.g., WB cache mode cache operations), embodiments of the invention may reserve some portion of the non-volatile cache memory for elasticity buffers 127 to enable storage system 110 to accommodate a storage device experiencing poor performance without cascading the performance degradation to other systems (e.g., application 101).

Elasticity buffers 127 may comprise one or more elasticity buffers according to embodiments herein. For example, each storage device of storage devices 131a-131n may be provided with a corresponding elasticity buffer. Alternatively, fewer elasticity buffers than the number of storage devices for which elasticity buffering is to be implemented may be provided according to embodiments herein. For example, one or more elasticity buffers to be shared among the storage devices may be dynamically assigned (e.g., by elasticity buffer manager 124) to a particular storage device then experiencing aberrant behavior.

The bandwidth and size of the elasticity buffers of embodiments herein may be determined by the duration of storage device data write delay (e.g., in seconds) that storage device controller 120 is to accommodate. For example, the bandwidth of current enterprise drives can reach around 200 MB/s under optimal conditions and this number could get as high as 350-400 MB/s within the next 5 years. Assuming that the most common "problem" case is a single slow storage device in a storage device group, the bandwidth of elasticity buffer 127 of embodiments could be set as low as 400 MB/s and be "future proof" for the expected lifetime of storage device controller 110 (e.g., 5 years). Continuing with this example, if 2 concurrently misbehaving storage devices are to be handled, the elasticity buffer bandwidth of embodiments herein may be set as 800 MB/s, and so on.

The amount of buffer memory provided by elasticity buffers of embodiments is dependent on the bandwidth consumed by the IO stream(s) and the length of time that it is desired to let a storage device behave correctly after a period of above average latency (e.g., to accommodate a background data movement, track reassignment, internal diagnostic, etc.). Accordingly, the capacity of the elasticity buffers of elasticity buffers 127 can be calculated from the foregoing bandwidth and the number of seconds of delay the buffer is to handle. For example, if the objective is for the elasticity buffer to handle one full storage device power cycle (which is a common recovery action for a misbehaving storage device), and a full storage device power cycle takes up to 60 seconds, the corresponding elasticity buffer capacity should be at least 400 MB/s*60 s=24 GB. As another example of capacities of elasticity buffers provided in accordance with the concepts herein, take the case of streaming video comprising 4K frames using 30 frames per second (fps) at 16 bit encoding, each stream would require ~1.7 GB/sec of bandwidth. A controller supporting 3 of these streams simultaneously through a 10 second storage device interruption would use 1.7 GB/sec/stream*3 streams*10 seconds=51 GB of elasticity buffer. It can be appreciated that the foregoing elasticity buffer capacities are easily accomplished with current flash technologies. Likewise, current flash technologies can support the foregoing exemplary bandwidth.

Data store 130 of embodiments comprises a storage array configuration accommodating storage of data upon storage devices 131a-131n. For example, data store 130 may comprise a redundant array of independent disks (RAID) configuration combining storage devices 131a-131n into a logical unit, such that data is disturbed across the storage devices according to a particular RAID level implemented (e.g., depending upon redundancy and/or performance requirements). Storage devices 131a-131n may comprise various configurations of storage media, such as disk memory, solid state memory, flash memory, optical memory, and/or other suitable computer readable media. Storage device controller 120 may be adapted to communicate with storage devices 131a-131n of data store 130 via communication link 111 according to various host protocols, such as a storage area network (SAN) protocol (e.g., small computer system interface (SCSI), fiber channel protocol (FCP), INFINIBAND, etc.) and thus storage devices 131a-131n may appear as a locally attached resources to OS 121. In this manner, storage device controller 120 may access data blocks of storage devices 131a-131n through the operating system, rather than expressly requesting abstract files.

System 100 of the illustrated embodiment includes one or more client systems, represented here as application 101, for which access to and/or communication with storage system 110 is provided. For example, data storage services may be provided to one or more such clients by storage system 110. Accordingly, applications operable upon a host system of application 101 may interact with components of storage system 110 via communication link 102 to store data, access data, manage data, etc. It should be appreciated that, although referred to as clients, such client systems may comprise systems traditionally thought of as client systems (e.g., termination points for the data stored by data store devices 130) as well as systems traditionally thought of as server systems (e.g., systems providing data handling and/or management services to other systems).

Systems of embodiments provided access to and otherwise provide communication with storage system 110, such as application 101, comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein. Although the systems of the illustrated embodiment provide communication with components of storage system 110 via communication link 102, it should be appreciated that other embodiments of the present invention may employ different means of providing the requisite communication with respect to systems herein.

It should be appreciated that, although each being shown as a single communication link, the aforementioned communication links (communication links 102 and 111) of system 100 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Communication links 102 and 111 of embodiments may comprise various forms, and even separate portions, of network infrastructure. For example, storage device controller 120 may be coupled to storage devices of data store 130 by a SAN while storage device controller 120 may be connected to other systems, such as application 101, by a more general data network (e.g., the Internet, a LAN, etc.).

As can be appreciated from the foregoing, system 100 provides a data storage system in which various digital data may be created, maintained, modified, and accessed (referred to collectively as data management). A logical mapping scheme providing logical data block mapping information, stored within and stored without the data structures, may be utilized by system 100 in providing such data management. For example, a file system implemented by storage device controller 120 and data store 130 may implement a logical data block allocation technique.

In an exemplary configuration of system 100, application 101 can utilize storage system 110 to store and retrieve data from volumes maintained by the file system implemented by storage device controller 120 and data store 130. In such an embodiment, for example, application 101 can send data packets to controller 120, wherein the data packets are stored in cache 126 for writing in batch to storage devices of data store 130 (e.g., during a dirty data cache flushing operation). In operation according to embodiments herein, storage device controller 120 monitors write operations with respect to the storage devices of data store 130 to detect a misbehaving storage device. As will be discussed more fully below, where misbehavior is detected with respect to a storage device write operation, controller 120 operates to write the data associated with the misbehaving storage device to an elasticity buffer of elasticity buffers 127 and to mark the corresponding cache blocks of cache 126 clean without the storage device having actually completed the data write. Accordingly, the elasticity buffers of embodiments provide buffering on an as needed basis with respect to storage device cache flushing operations and persistently store dirty write data from a storage device cache when a storage device is misbehaving with respect to storage device data write operation. The data stored in the elasticity buffers may be written from an elasticity buffer to the appropriate storage device, such as after recovery action is taken with respect to the storage device, when the storage device starts completing data write operations in a timely fashion, etc.

Figure 2:
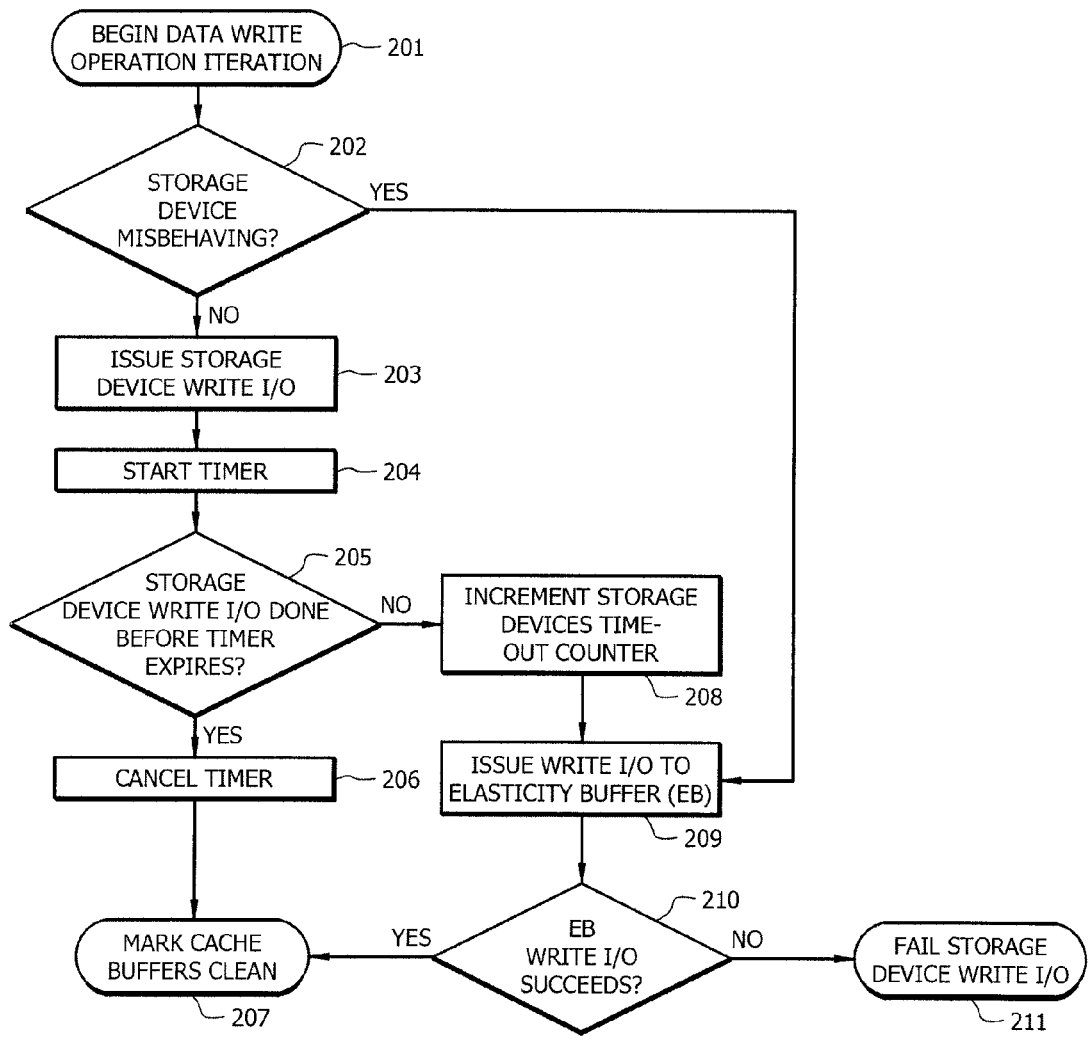
FIG. 2 shows a flow diagram of operation writing data to an elasticity buffer during aberrant operation of a storage device according to embodiments of the invention.
Figure 3:
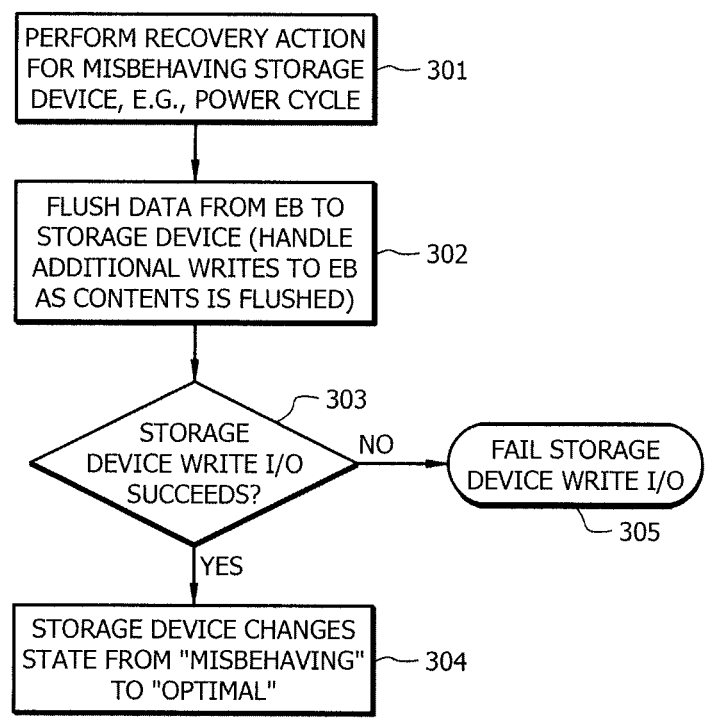
FIG. 3 shows a flow diagram of operation flushing data from an elasticity buffer after recovery of a storage device according to embodiments of the invention.

Having described system 100 adapted according to embodiments of the invention, attention is now directed to FIGS. 2 and 3. The high level flow diagrams of FIGS. 2 and 3 show operation of a system, such as system 100, implementing elasticity buffers for storing data to be written to a storage device when the storage device is determined to be misbehaving.

It should be appreciated that the flow diagrams of FIGS. 2 and 3 show process flows with respect to the operation of elasticity buffers implemented according to the concepts of the present invention and thus do not show various process steps which may be performed in data management by storage system 110 ancillary to the operation of the elasticity buffers. For example, although not shown in the flow diagram of FIG. 2, application 101 may communicate with storage system 110 to access (read and/or write) particular data stored upon the storage devices of the storage system. Accordingly, application 101 may perform data write operations whereby data to be stored by storage system 110 is communicated to storage device controller 120 by application 101. Target driver stack 122 of storage device controller 120 may provide a high level driver (e.g., a generic SCSI target) for interfacing with application 101 and different low level drivers (e.g., SAN, FCP, etc.) for providing host interface protocols utilized by storage device controller 120. Target driver stack 122 may interact with cache manager 123 to place the data in cache 126 for subsequent writing to one or more appropriate storage devices. For example, cache 126 may be operated under control of cache manager 123 to provide a WB cache mode wherein the data for writing to the storage devices is inserted into the cache and then at some later point in time written from the cache to the appropriate storage devices of data store 130.

At block 201 of the illustrated embodiment a process which implements elasticity buffers according to the concepts herein begins with a data write operation being initiated. For example, OS 121 may determine that dirty data stored by cache 126 is to be committed to one or more storage device and thus the cache flushed. Such a cache flush may be initiated by cache manager 123 when a predetermined number of cache blocks are determined to contain dirty data, when a particular amount of dirty data is present in the cache (e.g., when a stripe of data is ready to be written to the storage devices), when a predetermined time period has elapsed since a previous cache flushing operation, etc. Irrespective of the particular reason for writing the data from the cache to the storage devices, a data write operation is initiated (e.g., by cache manager 123) at block 201 of the illustrated embodiment and thus processing proceeds blocks 202-211 to implement elasticity buffers for storing data to be written to a storage device when the storage device is determined to be misbehaving.

In a typical cache data write operation, cache manager 123 may interact with initiator driver stack 125, such as may provide a high level driver (e.g., a generic SCSI target) for interfacing with cache manager 123 and different low level drivers (e.g., SAN, FCP, etc.) for providing interface protocols utilized by storage devices of data store 130, to write the data from cache 126 to appropriate ones of storage devices 131a-131n. However, embodiments herein dispose elasticity buffer manager 124 between cache manager 123 and the storage devices to which data is to be written (as shown in FIG. 1) in order to provide elasticity buffers for storing data to be written to a storage device when the storage device is determined to be misbehaving. It is this elasticity buffer manager that provides the operations of blocks 202-211 according to embodiments herein.

It should be appreciated that the operations of blocks 202-211 are preferably implemented on a per storage device basis. That is, for any storage device to which the data of a cache flushing operation is to be written, the operations of blocks 202-211 are performed according to embodiments of the invention. It should be appreciated, however, that although each storage device of storage devices 131a-131n may be provided with a corresponding elasticity buffer, embodiments operate to utilize fewer elasticity buffers than storage devices for which buffering is provided by the elasticity buffers. For example, a relatively small number of elasticity buffers, perhaps even 1 elasticity buffer, may be utilized to buffer data in accordance with the concepts herein due only a small number of storage devices of a storage device array are likely to experience aberrant behavior at any particular point in time (e.g., the elasticity buffer may be dynamically assigned to a particular storage device then experiencing aberrant behavior). Nevertheless, although only a single instance of each such block is shown in FIG. 2, multiple instances may be executed, whether in parallel or serially, to provide implementation of elasticity buffers of embodiments herein.

A determination is made by elasticity buffer manager 124 at block 202 as to whether a storage device to which the data is to be written is misbehaving. In particular, in operation according to the illustrated embodiment, if the past performance of a storage device to which data being flushed from the cache indicates that the storage device is experiencing a period of aberrant operation determined to be misbehavior, processing according to the illustrated embodiment branches out of the processing path which would directly attempt to write the data to the misbehaving storage device. Specifically, processing according to the illustrated embodiment proceeds to block 210 wherein the data is written by elasticity buffer manager 124 to an elasticity buffer of elasticity buffers 127 (e.g., an elasticity buffer associated with the misbehaving storage device). However, if a storage device to which data being flushed from the cache is not determined to be misbehaving by elasticity buffer manager 124, processing according to the illustrated embodiment proceeds to block 203.

At block 203 elasticity buffer manager 124 issues a storage device data write command to initiator driver stack 125 to cause data from cache 126 to be written to an appropriate storage device of data store 130. Accordingly, a data write operation is attempted for cache data destined for a storage device which has not been determined to be misbehaving.

Elasticity buffer manager 124 also starts a timer at block 204 when data is written from the cache to the storage devices. In operation according to embodiments, such a timer is started for each storage device write operation for use in identifying aberrant operation. For example, if the timer reaches a predetermined threshold value prior to the data write operation completing, it may be determined that the storage device is experiencing aberrant operation. The predetermined threshold value is preferably set to a reasonable write latency period for the particular type and model of storage device. For example, mean or average write latency times for particular storage devices may be used to establish an aberrant operation timer period according to embodiments herein. Additionally or alternatively, manufacturer's published performance parameters for particular storage devices may be utilized in establishing an aberrant operation timer period herein. Irrespective of how such a predetermined threshold value is initially established, embodiments of the invention may operate to adjust the value (e.g., periodically, upon the occurrence of an event, under control of a user, etc.) to adjust (e.g., optimize) operation of the elasticity buffers.

At block 205 of the illustrated embodiment a determination is made by elasticity buffer manager 124 as to whether the storage device data write operation has completed before the timer expires. If the data write operation completes before the timer expires, the storage device is not determined to be experiencing aberrant operation and thus the timer is cancelled (block 206) by elasticity buffer manager 124 and the appropriate cache buffers of cache 126 are marked as clean (block 207) by cache manager 123 since the data was successfully written to the storage device. If, however, it is determined at block 205 that the timer expired before the corresponding storage device data write operation is complete, it is determined that the storage device is experiencing aberrant behavior and processing according to the illustrated embodiment proceeds to block 208.

At block 208 the instance of storage device aberrant behavior is noted by elasticity buffer manager 124 for determining whether the storage device is misbehaving. For example, a time-out counter (e.g., providing a count of instances the storage device timer has expired before the data write operation completed) associated with the storage device may be incremented. In operation according to embodiments herein, if a storage device experiences aberrant operation for some period, that storage device will be deemed to be misbehaving (e.g., as determined at block 202). For example, a predetermined number (e.g., 2, 3, etc.) of time-outs experienced in adjacent data write operations with respect the storage device may result in the storage device being deemed to be misbehaving. Additionally or alternatively, a predetermined number (e.g., 2, 3, etc.) of time-outs experienced within a particular period of time (e.g., minute, day, week, etc.) may result in the storage device being deemed to be misbehaving.

Having noted the instance of storage device aberrant behavior, processing according to the illustrated embodiment proceeds to block 209 wherein the data being written to the storage device for which the write operation did not complete before the timer expired is written by elasticity buffer manager 124 to an elasticity buffer of elasticity buffers 127 associated with the storage device. In operation according to embodiments herein, the logical block addresses (LBA) for the data stored in the elasticity buffer are kept in a special dirty state to ensure that any reads to those LBAs fetch the data from the elasticity buffer and not from the storage devices of data store 130.

The data in elasticity buffer 127 of embodiments has the same level of persistence as the data in cache 126. Accordingly, data in the elasticity buffer could be lost if storage device controller 120 completely fails, just as the data in cache 126 would be lost if storage device controller 120 completely fails. Thus, implementation of elasticity buffers for storing data to be written to a storage device of a storage system when a data write operation of the storage device is determined to be outside of an acceptable parameter according to embodiments is provided for data in LUs configured for WB cache mode operation.

In operation according to embodiments of the invention, although the data is written to an elasticity buffer at block 209, the data write operation previously issued with respect to the storage device experiencing aberrant behavior is not aborted. The interruption of the data write operation may result in unpredictable results with respect to the storage of data by the storage device. For example, a subsequent data write operation may have been issued with respect to the storage device which may also be terminated if the data write operation associated with the data written to the elasticity buffer were terminated. Accordingly, embodiments herein may operate to allow the storage device data write operation associated with the time-out to continue for normal handing by the storage device. Alternative embodiments of the invention, however, may abort such data write operations upon writing the data to an elasticity buffer herein (e.g., upon determining that the elasticity buffer data write operation was successful).

At block 210 of the illustrated embodiment a determination is made as to whether the elasticity buffer data write operation was successful. If the elasticity buffer data write operation was not successful (e.g., the elasticity buffer is full due to the storage device failing to recover, the elasticity buffer itself misbehaving, etc.), processing according to the illustrated embodiment proceeds to block 211 wherein the storage device data write operation is failed (e.g., a data write error is issued, the storage device is removed from the storage device array, etc.). If, however, the elasticity buffer data write operation was successful, processing according to the illustrated embodiment proceeds to block 207.

At block 207 of the illustrated embodiment, the appropriate cache buffers of cache 126 are marked as clean by cache manager 123 operating under control of elasticity buffer manager 124. For example, elasticity buffer manager 124 may provide control signals to cache manager 123 similar to those provided by initiator driver stack 125 when a data write operation successfully completes. Accordingly, although the data was not successfully written to the storage device, the data was written successfully to an elasticity buffer of elasticity buffers 127 and thus implementation of elasticity buffers for storing data to be written to a storage device of a storage system when a data write operation of the storage device is determined to be outside of an acceptable parameter allows the cache to be cleared and operation of the storage system to continue normally. Such operation allows a host write to a WT LU or a flush operation for a WB LU to complete in a timely fashion despite one or more storage device misbehaving.

Although the flow diagram of FIG. 2 terminates after the cache buffers are marked clean at block 207, it should be appreciated that the flow may be repeated for each iteration of data write operations. Accordingly, misbehavior of storage devices of data store 130 may be accommodated by elasticity buffers 127 to prevent temporary periods of storage device aberrant operation from causing undesired operation of storage system 110, such as dropping data, providing slow performance as viewed by application 101, etc.

Having described operation according to the flow of FIG. 2 resulting in data being written to elasticity buffers for storing data when the storage device is determined to be misbehaving, attention is now directed to the flow of FIG. 3 providing operation to flush data from the elasticity buffers. It should be appreciated that the flow of FIG. 3 may be performed synchronously or asynchronously with respect to the flow of FIG. 2. In operation according to embodiments herein, the flow of FIG. 3 may be initiated when a storage device is determined to be misbehaving in the flow of FIG. 2 (e.g., block 202). Additionally or alternatively, the flow of FIG. 3 may be initiated aperiodically, such as upon the occurrence of an event (e.g., when data is written to the elasticity buffers).

At block 301 of the illustrated embodiment a recovery action is performed for a storage device identified as misbehaving. For example, the misbehaving storage device may be power cycled in an attempt to reset the storage device and cease its aberrant operation. Such power cycles often include resetting and recalibration of various attributes of a device and thus often correct aberrant operation.

It should be appreciated that the recovery action is taken at block 301 of embodiments in order to facilitate writing of the data stored in the elasticity buffer. For example, if no recovery action is taken with respect to a storage device, the storage device may continue to experience aberrant operation and thus writing of the data from the elasticity buffer to the storage device may suffer from the same problems as the original cache data write attempt. The recovery action taken may comprise power cycling the misbehaving storage device, reinitializing one or more drivers associated with the misbehaving storage device, initiating a recalibration routine with respect to one or more functions of the misbehaving storage device, initiating a diagnostic routine with respect to the misbehaving storage device and performing one or more indicated remedial actions, updating the firmware on the misbehaving storage device, the misbehaving storage device may be replaced with a hot spare storage device (e.g., the rebuild process may be coordinated with the elasticity buffer management to ensure that new data from the elasticity buffer is incorporated into the rebuilt data stream for the drive), etc. Of course, where the aberrant operation ceases on its own (e.g., an internal recovery algorithm of the storage device remediates the aberrant behavior, a cause of the aberrant behavior dissipates, etc.), the performance of recovery actions at block 301 may be foregone. Irrespective of whether a particular recovery action was taken or it was determined that the aberrant operation ceases on its own, after performing the processes of block 301 of embodiments herein there is an expectation that the previously misbehaving storage device is now able to complete data write operations within reasonable limits.

At block 302 of the illustrated embodiment the data buffered by the elasticity buffer is flushed to the recovered storage device. For example, elasticity buffer manager 124 issues a storage device data write command to initiator driver stack 125 to cause data from elasticity buffers 127 to be written to an appropriate, recovered storage device of data store 130. In operation according to embodiments, the data may not be written directly from the elasticity buffers to the storage devices. For example, the data may instead be copied from an elasticity buffer of elasticity buffers 127 to cache blocks of cache 126 to facilitate a data write to the storage device using the same data write protocols implemented with respect to other data of storage system 110. Nevertheless, the data is flushed from the elasticity buffer to the storage device and the corresponding capacity in the elasticity buffer is freed.

A determination is made as to whether the storage device data write operation associated with the flushing of the elasticity buffer succeeds at block 303 of the illustrated embodiment. For example, elasticity buffer manager 124 may again implement a data write timer as discussed above with respect to blocks 204 and 205 to determine if the aberrant operation of storage device has been resolved. If the storage device write operation associated with the flushing of the elasticity buffer was not successful (e.g., the storage device fails to recover), processing according to the illustrated embodiment proceeds to block 305 wherein the storage device data write operation is failed (e.g., a data write error is issued, the storage device is removed from the storage device array, etc.). If, however, the storage device write operation associated with the flushing of the elasticity buffer was successful, processing according to the illustrated embodiment proceeds to block 304.

The recovered storage device state is changed from "misbehaving" at block 304 of the illustrated embodiment. That is, the storage device write operation completed successfully with respect to the data flushed from the elasticity buffer indicating that the storage device has successfully recovered and thus the status of the storage device is no longer indicated as a misbehaving storage device.

From the foregoing it can be appreciated that elasticity buffers of embodiments herein provide for storage of data to be written to a storage device when a data write operation of the storage device is determined to be outside of an acceptable parameter and, thereafter, provide for the data to be written to the storage device once recovered. Elasticity buffer of embodiments thus provides buffering on an as needed basis with respect to storage device cache flushing operations to thereby persistently store dirty write data from a storage device cache when a storage device data write experiences aberrant operation. Thus, storage systems implementing elasticity buffers according to the concepts herein are enabled to accommodate a storage device experiencing poor performance without propagating the performance degradation to other systems.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computing device comprising:
   a memory containing machine readable medium comprising machine executable code having stored thereon instructions for performing a method of providing write elasticity;
   a processor coupled to the memory, the processor configured to execute the machine executable code to cause the processor to:
   detect an aberrant write operation of data to a storage device from among a plurality of storage devices prior to storing the data to an elasticity buffer, wherein the aberrant write operation comprises a duration of time for the storage device to complete a write operation exceeding a predetermined time threshold;

select a memory capacity of the elasticity buffer based on a bandwidth consumed by a data stream, a duration of predicted delay based on the aberrant write operation, and a period after recovery from the aberrant write operation;

store the data to be written in the aberrant write operation in the elasticity buffer in response to the detection;

mark a portion of a cache associated with the aberrant write operation as clean after storing the data in the elasticity buffer, wherein the elasticity buffer and the cache are separate entities; and write the data stored in the elasticity buffer to the storage device in response to a subsequent write operation to the storage device being within the predetermined time threshold.

2. The computing device of claim 1, the machine executable code further causing the processor to:

dynamically assign the elasticity buffer to a particular storage device of the plurality of storage devices in response to the aberrant write operation being detected.

3. The computing device of claim 1, the machine executable code further causing the processor to:

select a bandwidth of the elasticity buffer based on a bandwidth of the storage device.

4. The computing device of claim 1, wherein the write operation comprises a cache flushing data write operation.

5. A method comprising:

detecting, by a storage management computing device, an aberrant write operation of data to a storage device from among a plurality of storage devices prior to storing the data in an elasticity buffer, wherein the aberrant write operation comprises a duration of time for the storage device to complete a write operation exceeding a predetermined time threshold;

selecting, by the storage management computing device, a memory capacity of the elasticity buffer based on a bandwidth consumed by a data stream, a duration of predicted delay based on the aberrant write operation, and a period after recovery from the aberrant write operation;

storing, by the storage management computing device, the data to be written in the aberrant write operation in the elasticity buffer in response to the detecting;

marking, by the storage management computing device, a portion of a cache associated with the aberrant write operation as clean after storing the data in the elasticity buffer; and writing, by the storage management computing device, the data stored in the elasticity buffer to the storage device in response to a subsequent write operation to the storage device being within the predetermined time threshold.

6. The method of claim 5, further comprising:

performing a recovery action in response to the aberrant write operation being detected, the recovery action comprising at least one of cycling power to the storage device and replacing the storage device with a hot swappable spare storage device.

7. A non-transitory machine readable medium having stored thereon instructions for performing a method comprising machine executable code which when executed by at least one machine, causes the machine to:

detect an aberrant write operation of data to a storage device from among a plurality of storage system devices prior to storing the data to an elasticity buffer, wherein the aberrant write operation comprises a duration of time for the storage device to complete a write operation exceeding a predetermined time threshold;

select a memory capacity of the elasticity buffer based on a bandwidth consumed by a data stream, a duration of predicted delay based on the aberrant write operation, and a period after recovery from the aberrant write operation;

store the data to be written to the storage device in the elasticity buffer in response to the detection;

mark a portion of a cache associated with the aberrant write operation as clean after storing the data in the elasticity buffer; and write the data stored in the elasticity buffer to the storage device in response to a subsequent write operation to the storage device being within the predetermined time threshold.

8. The non-transitory machine readable medium of claim 7, further comprising machine executable code that causes the machine to:

performing a recovery action in response to the aberrant write operation being detected, the recovery action comprising at least one of cycling power to the storage device and replacing the storage device with a hot swappable spare storage device.

9. The non-transitory machine readable medium of claim 7, further comprising machine executable code that causes the machine to:

selecting a bandwidth of the elasticity buffer based on a bandwidth of the storage device.

10. The non-transitory machine readable medium of claim 7, further comprising machine executable code that causes the machine to:

dynamically assigning the elasticity buffer to a particular storage device of the plurality of storage devices in response to the aberrant write operation being detected.

11. The non-transitory medium of claim 7, wherein the write operation comprises a cache flushing data write operation.

12. The non-transitory medium of claim 11, wherein the elasticity buffer comprises a reserved portion of cache memory for the cache flushing data write operation or non-volatile memory for the cache flushing data write operation.

13. The non-transitory medium of claim 7, wherein the aberrant write operation further comprises a number of time-outs in a predetermined period of time exceeding a threshold time-out value.

14. The computing device of claim 1, the machine executable code further causing the processor to:

perform a recovery action in response to the aberrant write operation being detected, the recovery action comprising at least one of cycling power to the storage device and replacing the storage device with a hot swappable spare storage device.

15. The computing device of claim 4, wherein the elasticity buffer comprises a reserved portion of cache memory for the cache flushing data write operation or non-volatile memory for the cache flushing data write operation.

16. The computing device of claim 1, wherein the aberrant write operation further comprises a number of time-outs in a predetermined period of time exceeding a threshold time-out value.

17. The method of claim 5, further comprising:
dynamically assigning, by the storage management computing device, the elasticity buffer to a particular storage device of the plurality of storage devices in response to the aberrant write operation being detected.

18. The method of claim 5, further comprising:
selecting, by the storage management computing device, a bandwidth of the elasticity buffer based upon a bandwidth of the storage device.

19. The method of claim 5, wherein the write operation comprises a cache flushing data write operation.

20. The method of claim 19, wherein the elasticity buffer comprises a reserved portion of cache memory for the cache flushing data write operation or non-volatile memory for the cache flushing data write operation.

21. The method of claim 5, wherein the aberrant write operation further comprises a number of time-outs in a predetermined period of time exceeding a threshold time-out value.

* * * * *